Dec. 30, 1947.    W. D. HERSHBERGER    2,433,758
RADIO PULSE GENERATOR
Filed Jan. 25, 1940
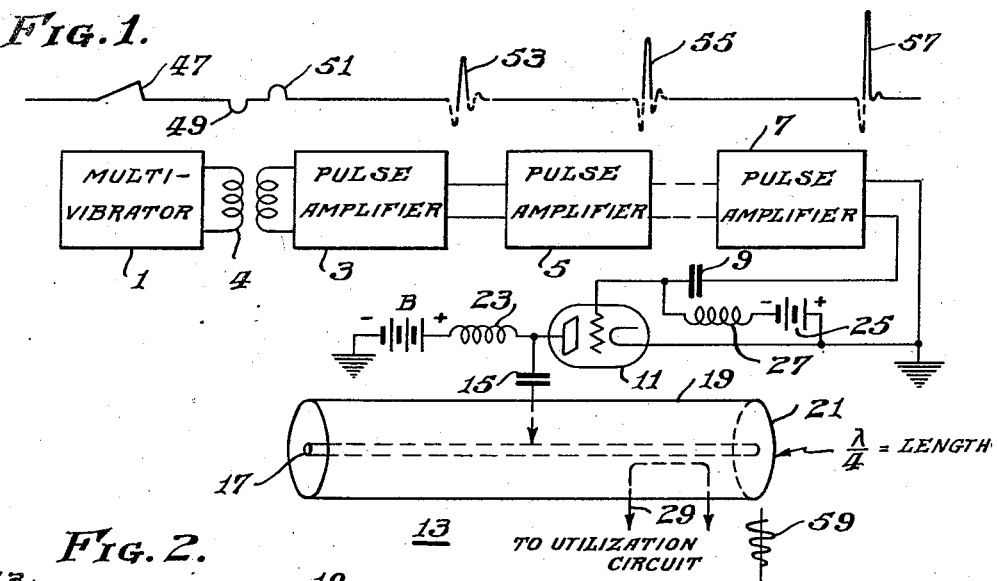
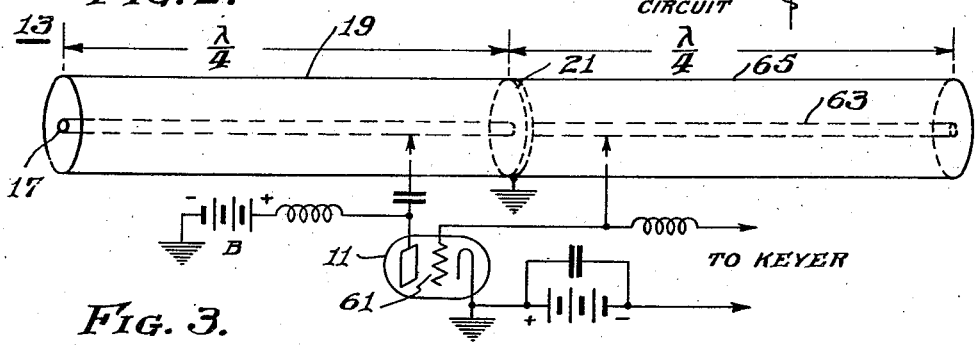
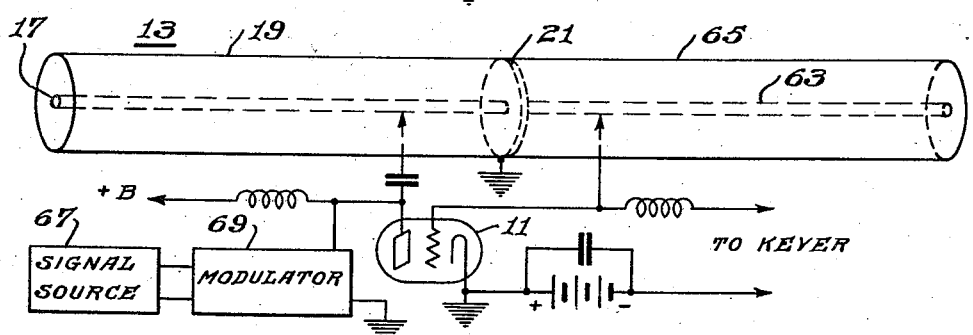
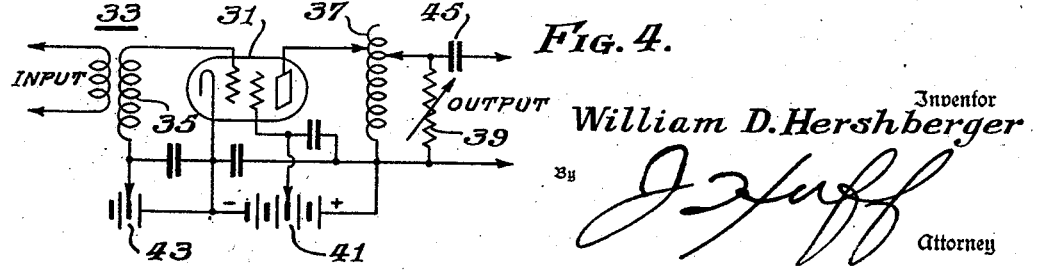
Inventor
William D. Hershberger
By
Attorney Patented Dec. 30, 1947

2,433,758

UNITED STATES PATENT OFFICE 2,433,758

RADIO PULSE GENERATOR

William D. Hershberger, Haddonfield, N. J., assignor to Radio Corporation of America, a corporation of Delaware Application January 25, 1940, Serial No. 315,601

6 Claims. (Cl. 179—171.5)

1

This invention relates to generators of radio frequency currents and more particularly to a generator for establishing extremely brief pulses of radio frequency energy.

A number of radio devices are operated by extremely brief pulses of radio frequency energy. These devices are used in signaling and in making measurements. One such measurement involves timing the interval between an outgoing pulse and reception of the pulse after reflection from an object whose distance is to be measured. Since the velocity of radio wave propagation is known to be 300 meters per microsecond, the distance the wave travels may be indicated as a function of time. Thus, if the time elapsing between transmission and reception is onetenth microsecond, the wave will have traveled 30 meters and, therefore, the distance to the wave reflecting object will be ½ of 30 meters or 15 meters. In the assumed example, it is desirable to prevent overlapping of the transmitted and reflected pulse otherwise the time interval can not be measured with certainty.

While it is not difficult to obtain radio frequency pulse energy of a few tenths of a microsecond duration, it is difficult to obtain pulses of the order of one tenth and less microseconds. This difficulty is due to a number of causes: first, it is difficult to build practical thermionic oscillators developing large amounts of power at ultra high frequencies; second, given practical ultra high frequency oscillators, it is difficult to start the oscillations quickly; and third, the persistency of tuned circuits makes quick starting and stopping of ultra high frequency oscillations almost impossible when the circuits are connected to a conventional thermionic tube in a conventional manner.

A tuned circuit has reactive and resistive properties. The ratio of reactance to resistance is known as Q. The larger Q is made the less are the losses and the more persistent the oscillations; the lower Q the greater the losses and the more damped the oscillations. If Q is high, quick starting and stopping can not be realized in a conventional oscillator; if Q is low a conventional thermionic tube used in an oscillator circuit is unable to sustain or even start oscillations.

One of the objects of the invention is to provide means for generating radio frequency energy pulses of extremely short duration.

Another object is to provide means for shock exciting an ultra high frequency resonant circuit.

Another object is to provide means for applying a current pulse of extremely short duration

2 to a resonant circuit which generates a pulse of radio frequency energy.

An additional object is to provide means for generating pulses of radio frequency energy and for modulating the pulses so that they convey signal information.

The invention will be described by referring to the accompanying drawing in which Figure 1 is a schematic circuit diagram of one embodiment of the invention;

Figure 2 is a circuit diagram of a modified pulse generator;

Figure 3 is a circuit diagram of a modulator and pulse generator; and

Figure 4 is a circuit diagram of one form of pulse amplifier.

Similar reference numbers will be used to designate similar parts.

Referring to Fig. 1 a multivibrator 1 is connected to a plurality of cascaded pulse amplifiers 3, 5, 7 which will be described hereinafter. The output of the last pulse amplifier 7 is connected through a capacitor 9 to the grid and cathode electrodes of a thermionic tube 11. The anode and cathode of the tube 11 are connected to an oscillatory circuit which is preferably a quarter wave concentric line 13. The anode connection is made through a capacitor 15 to the inner conductor 17 of the line. The outer conductor 19 is connected through a grounding plate 21 to the inner conductor and to the cathode.

The anode B supply is applied to the anode electrode through a radio frequency choke coil 23. The grid is biased to cut off or beyond by a battery 25 which is connected to the grid by a choke coil 27 and to ground. The output circuit may be a mutually coupled loop 29, a capacity coupling or a conductive connection to the inner conductor 17.

The circuit diagram of one suitable form of pulse amplifier is shown in Fig. 4. The input of the amplifier tube 31 may include a transformer 33 whose secondary 35 is connected to the control grid electrode and to the cathode electrode of the tube. The anode is connected to an inductor 37 which may be shunted by a resistor 39. The inductor is connected to the anode battery 41. The screen grid electrode of the tube 31 is connected to the anode battery. The grid is biased to cut-off by means of a battery 43. The output of the amplifier is connected to the input of succeeding stages by means of a capacitor 45, transformer or the like.

The operation of the system of Fig. 1 is as follows:

The multivibrator 1 applies currents of sawtooth wave form 47 which are differentiated and are applied as pulses 49 to the primary of the transformer 4 which connects the multivibrator to the input of the pulse amplifier 3. The pulses 49 are reversed by the transformer action and thereby become positive pulses 51. These positive pulses overcome the negative bias of the grid circuit of the amplifier and permit surges of anode current to pass through the inductor of the pulse amplifier (Fig. 4—reference numeral 37). The inductor differentiates (mathematically speaking) and derives a shortened pulse 53 which tends to oscillate but damping action of the inductor shunt resistor (or the resistance of the inductor itself) causes the oscillations to die out very quickly. The positive peak of the highly damped train of oscillations is applied to the second pulse amplifier 5. The second pulse amplifier, like the first, shortens the applied pulse by differentiation. Thus, each pulse amplifier shortens the pulse by differentiation and by selecting the upper portion of the first positive peak of the damped wave train. The pulses, shortened as to duration, may be increased as to amplitude by the amplifying action of the several cascade stages as indicated by the output wave forms 55, 57.

The final output current from the pulse amplifier is of a duration of the order of a half cycle of the oscillatory circuit 13, which is to be shock excited. This current is used to key the tube 11 whose anode circuit applies a slug of current to the oscillatory circuit. The slug of current shock excites the tuned circuit 13, which proceeds to oscillate. The oscillations 59 die out, not rapidly as in the case of the deliberately damped pulse amplifiers, but comparatively slowly at a rate determined mainly by the resistance of the tuned circuit and the load applied thereto by the antenna or utilization circuit 29. Because the tube 11 is biased to cutoff except during application of the slug current, it does not load the oscillatory circuit as was the case of the prior art shock devices.

Regeneration may be applied to increase the amplitude of the shock excited oscillations or the ease with which the oscillations may be excited. A circuit for establishing regeneration is shown in Fig. 2. The grid electrode 61 is connected to a section 63 of the inner conductor which is included in an extended portion 65 of the concentric line tank circuit. The amount of regeneration is determined by the voltage derived from length of line between the grid connection and the ground plate 21. The amount of regeneration should be less than that required to sustain oscillations.

The pulses of radio frequency energy may be modulated by employing a modulator as shown in Fig. 3. A signal source 67 is connected to a modulator 69. The output of the modulator is applied to the anode of the thermionic tube 11. The slugs of current applied to the oscillatory circuit 13 will vary in amount in accordance with the applied modulation. The device, thus modulated, may be used simultaneously to communicate voice or other tone signals and to measure distance. It will be observed that the circuit for regeneration has been included in the modulation circuit. It should be understood that the regenerative circuit may be omitted. In that case the modulation may be applied to the circuit of Fig. 1.

Thus, the invention has been described as a device or method of generating extremely short pulses of radio frequency energy. The pulses are generated without resorting to a conventional feedback or other form of thermionic oscillator. The method employed is based on shortening and amplifying pulses until the final pulse is applied to shock excite an oscillatory circuit. The applied pulses may be modulated to convey speech or like information. The pulses of radio frequency energy may be used to measure distance in accordance with applicant's copending application Serial No. 196,587, filed March 18, 1938, for Antenna switching system, now Patent 2,189,-549, issued February 6, 1940, although the use of the instant invention is not limited to distance measurement. Likewise the invention is not limited to a multivibrator as the initial pulse source, nor to the particular type of pulse amplifiers, nor to a concentric line tank circuit.

I claim as my invention:

1. A radio frequency pulse generator including a source of variable current, means for deriving pulses of current from said variable current, an oscillatory circuit consisting of a resonant line having a higher Q, in which Q is the ratio of reactance to resistance, than would be realized with a circuit having lumped inductance and capacitance, and means for applying slugs of current to shock excite said oscillatory circuit to develop oscillatory currents of a frequency independent of the repetition rate of said slugs of current.

2. A radio frequency pulse generator including an oscillatory circuit consisting of a resonant line having a higher Q, in which Q is the ratio of reactance to resistance, than would be realized with a circuit having lumped inductance and capacitance, a thermionic tube having input and output circuits, a keyer for generating positive pulses, means connecting said output circuit to said oscillatory circuit and input circuit to said keyer, and means for biasing said tube to cutoff so that said positive pulses applied to said tube input circuit cause slugs of anode current to be applied through said output circuit to said oscillatory circuit to develop oscillatory currents of a frequency independent of the repetition rate of said slugs of current.

3. A radio frequency pulse generator of the character of claim 2 including a connection for applying regeneratively currents to said input circuit to increase the radio frequency output and the ease of excitation of said radio frequency pulse generator.

4. A radio frequency pulse generator of the character of claim 2 including means for applying modulation currents to said thermionic tube to modulate the radio frequency currents produced in said device.

5. A radio frequency pulse generator including in combination an oscillatory circuit consisting of a resonant line having a higher Q, in which Q is the ratio of reactance to resistance, than would be realized with a circuit having lumped inductance and capacitance, a pulse amplifier, a thermionic tube having its output circuit connected to said oscillatory circuit and its input circuit connected to said pulse amplifier, means for biasing said tube to cutoff so that pulses from said amplifier cause anode current to be applied to said oscillatory circuit for an extremely brief interval to shock excite said oscillatory circuit to develop oscillatory currents of a frequency independent of the repetition rate of said slugs of current.

6. A device of the character of claim 5 in which said pulse amplifier is preceded by a plurality of pulse amplifiers and in which each of the plurality of pulse amplifiers is arranged to shorten the duration of the pulses applied from the preceding pulse amplifier so that pulses of extremely short duration are established.

WILLIAM D. HERSHBERGER.

REFERENCES CITED

The following references are of record in the file of this patent:

UNITED STATES PATENTS

| Number | Name | Date |
| --- | --- | --- |
| 1,908,249 | Hund | May 9, 1933 |
| 1,695,042 | Fearing | Dec. 11, 1928 |
| 1,934,574 | Vos | Nov. 7, 1933 |
| 2,181,568 | Kotowski et al. | Nov. 28, 1939 |
| 2,103,090 | Plebanski | Dec. 21, 1937 |
| 2,118,977 | Lewis | May 31, 1938 |

OTHER REFERENCES

Communication Engineering, by Everitt, Pub. by McGraw Hill Co., 1937, pages 530–531.